United States Patent [19]

Tison

[11] 3,841,011

[45] Oct. 15, 1974

[54] LONG-LINE SETTING, BAITING AND HAULING SYSTEM AND APPARATUS

[75] Inventor: Kenneth F. Tison, Sitka, Alaska

[73] Assignee: Marine Construction & Design Co., Seattle, Wash.

[22] Filed: Apr. 30, 1973

[21] Appl. No.: 356,060

[52] U.S. Cl. ................ 43/4, 43/27.4, 43/54.5 A
[51] Int. Cl. .................... A01k 89/00, A01k 97/06
[58] Field of Search ..... 43/6.5, 4, 4.5, 27.4, 54.5 A, 43/8; 242/106, 118, 41, 128, 129.51; 254/184

[56] References Cited
UNITED STATES PATENTS

| | | | |
|---|---|---|---|
| 1,619,512 | 3/1927 | Heckman | 43/27.4 |
| 2,492,515 | 12/1949 | Beard | 242/106 |
| 2,511,828 | 6/1950 | Andrist | 43/4 |
| 2,518,590 | 8/1950 | Andrist | 43/4 |
| 2,670,556 | 3/1954 | Hopkins et al | 43/4 |

*Primary Examiner*—Warner H. Camp
*Attorney, Agent, or Firm*—Christensen, O'Connor, Garrison & Havelka

[57] ABSTRACT

A system for conducting long-lining operations from fishing vessels is disclosed, featuring a special deck arrangement of hauler, line setter, automatic baiter, reel stacking areas and associated operating stations. The line dispenser, with dual reel support head, addresses a loaded line storage reel to the baiter as another reel support is disposed for empty reel removal and full reel reloading, whereupon it can be revolved 180° to reverse the roles. Spacing between the baiter side walls leading from the dispenser to the bait hopper permits transverse back-and-forth migration of the unspooling line in the baiter so as to pick up bait pieces from the hopper across its width, whereas an exit chute is formed and arranged to permit recovery of dislodged bait not securely impaled by the gangion hooks. Line storage reels are formed to permit them to nest in stacked relationship, empty ones ready for mounting on the power driven line hauler at a relatively forward location, and full ones adjacent the line dispenser situated aft with the automatic baiter.

21 Claims, 9 Drawing Figures

LONG-LINE SETTING, BAITING AND HAULING SYSTEM AND APPARATUS

BACKGROUND OF INVENTION

This invention relates to improvements in the art of long-line fishing and more particularly to improved systems and apparatus for setting, baiting, and hauling long-lines from fishing vessels. Reference is hereby made to my prior issued U.S. Pat. No. 3,626,630 disclosing and claiming certain advancements in the art also relating to the setting, baiting and hauling of long-lines.

A broad object of the present invention is to provide a long-line setting and baiting system and apparatus which occupies minimum deck area on the vessel and can be installed and operated conveniently on vessels of different sizes and configurations. With the improved apparatus any desired number of long-line reels or spools may be stored on the deck area of the vessel and installed in turn on the line setting or dispensing device in order to set any desired number of lines in quick succession while running the vessel over the fishing grounds.

A further object of this invention is to provide a relatively inexpensive, compact and efficient line storage, setting, and hauling mechanism, and associated automatic baiter which can be readily afforded by the owners of small vessels as well as large ones and which can greatly increase the capacity of the vessel to set and retrieve lines in a given time period.

Still another object hereof is to provide a line setter and automatic baiter mechanism with associated controls so organized and arranged that the operator stationed at a convenient observation point can readily monitor and manage the operation. As such, one man can readily control the rate of dispensing of line, affix the necessary weights and buoys, attach other lines serially, and replenish the bait supply, change line storage reels on the dispensing mechanism and generally do any trouble shooting necessary to operate the system effectively.

Still another object hereof is to devise a system of the type described wherein the hauling subsystem is also so organized and arranged on the vessel as to utilize the deck space most effectively while stationing the operator for maximum efficiency and safety. Thus the operator stationed adjacent the helm house during hauling operations can observe and direct the progress of the vessel while managing the line being hauled. Management in this instance involves controlling the rate of re-spooling the line, attaching gangion hooks on the spool spokes, removing fish as they come aboard, and generally watching for snarls or snags requiring untangling or special maneuvering of the vessel.

A specific object hereof is to devise an improved storage reel configuration whereby a number of such reels may be nested and stacked conveniently and safely on deck, and whereby individual reels to be operated on the line hauler and line dispenser can be quickly and easily mounted and dismounted. Sturdy, lightweight, durable construction of the storage reels constitute related objectives.

Still another specific object hereof is to devise an improved baiter operatively associated with the line dispensing apparatus, wherein the line is quickly inserted without necessity of threading, and by achieving a transverse line scanning motion bait chunks are impaled by the gangion hooks from different points across the width of the base of the bait hopper rather than in a single location, hence the hooks are more reliably baited during line setting. As a further advantage, a discharge guide chute assoicated with the baiter recovers bait chunks removed from the baiter but not securely impaled by the hooks before dropping overboard and wasted.

These and other objects of the invention will become more fully apparent as the description proceeds.

BRIEF DESCRIPTION OF INVENTION

As herein disclosed the individual line storage reels preferably comprise molded fiberglass-reinforced plastic hubs and integrally formed flanges at one end thereof, with radial spokes at the opposite end of the hub serving as the opposite end flange and to secure the gangion hooks. The spoke inner ends project inwardly through the hub to serve as locking devices engageable with notches in the mounting hubs of the dispensing and hauling mechanisms. A spring latch mounted interiorly of the dispensing mechanism and hauling mechanism rotative reel supports releasably engages a projection, such as the inner end of one spoke on the reel, so as to hold the reel in place. A turned lip on the reel flange forms a recess or pocket into which nests the spoked end of an adjacent reel so as to permit stacking of reels on deck in nested relationship.

The line dispensing mechanism comprises an upright stand with a revolving head on the upper end thereof carrying two oppositely projecting rotative reel supports and movable between either of two positions 180° apart. In one position, the head positions one reel in alignment with the baiter for dispensing of the line on the reel through the baiter, whereas the other reel support on the head is disposed for convenient removal of an empty reel or installation of a full reel. Brake means in the dispensing stand preferably controlled from a station near the stern of the vessel enables the operator to exert the desired tension force in the line during setting.

Line retrieval is achieved by a power driven hauler located at a relatively forward position. A power drive for the hauler reel support can be reversed and varied in its speed and drive torque applied to the reel under control of the operator. Stationed to remove fish from the incoming gangion hooks, the operator can start and stop the power drive as needed, set the hooks on the in-haul reel spokes for storage and vary the heading of the vessel to track down the set line being hauled.

The arrangement of the line hauler, baiter, line setter and of stacked full and empty reels on deck is such that the sub-system functions are most conveniently and safely performed, consuming a minimum of deck space and with a maximum of line handling capacity, both in respect to the amount of line that can be stowed and handled, and the rate at which lines can be set and retrieved using the system.

DESCRIPTION OF PREFERRED EMBODIMENT

The system and apparatus of the present invention comprise improvements in the subject matter of my earlier U.S. Pat. No. 3,626,630, Dec. 14, 1971, "Fish Line Reeling and Baiting Apparatus," wherein there is disclosed a means and technique for long-line fishing and various aspects of such fishing also applicable to the present invention. Reference is made to the disclosure and references cited in the file of said patent as background to the present invention.

Figure 1:
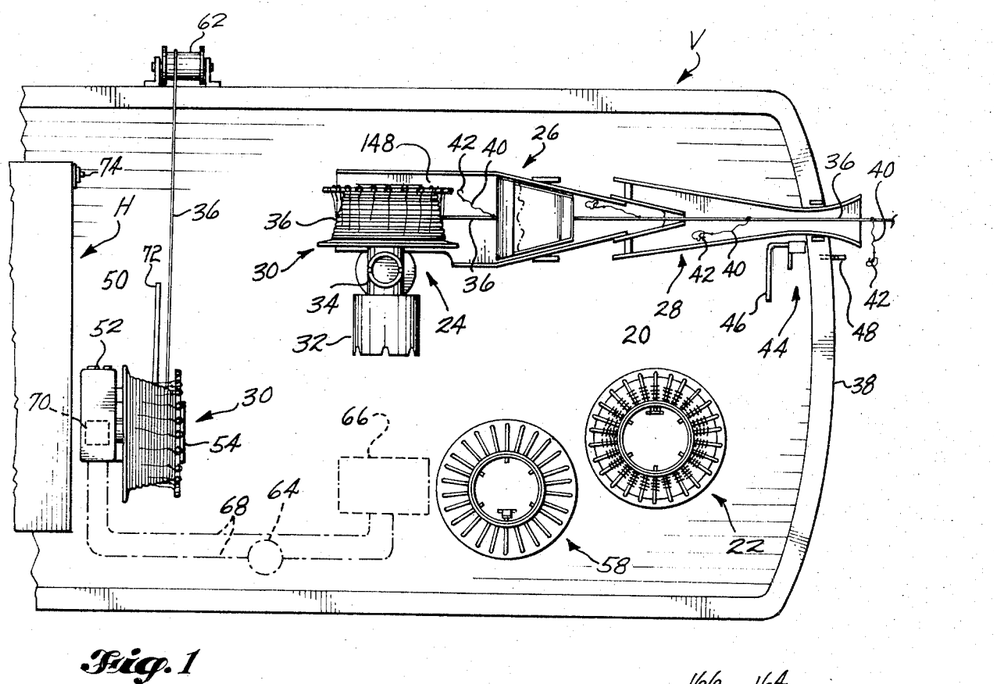
FIG. 1 is a plan view of the stern portion of a fishing vessel incorporating apparatus of this invention.

In FIG. 1 the illustrated stern portion of the fishing vessel V comprises two functional work areas and associated subsystems. The aft subsystem located generally at area 20 operates to bait and set the lines. The forward subsystem located generally at area 50, preferably immediately adjacent the aft side of the helm house H and forwardly of the fish hold hatch (not shown), operates to retrieve or haul lines previously set. Typically the fishing boat will carry a substantial number of individual longlines 36, each with short leaders or gangions 40 fastened at intervals thereto, with a hook 42 on each gangion. In the traditional practice of the art the individual long-lines were stored in separate tubs and set tediously by hand. The improvements disclosed in my earlier U.S. Pat. No. 3,626,630 offer an effective means to set and retrieve the lines expeditiously and, in the process of setting, to bait the hooks automatically. That system entailed use of a series of spools mounted on a transverse support shaft, and a traveling baiter mechanism which could be positioned to cooperate with individual reels during setting the lines successively.

In accordance with the present invention the reels or spools are separately stored on the deck of the vessel, such as in a stack 22, and are individually removed from the stack and placed upon a dispensing stand 24 one at a time. From the stand each line 36 is spooled out through an automatic baiter 26 and associated guide line chute 28 over the vessel's stern 38.

The setting or dispensing stand 24 comprises a base in the form of an upright post 112 upon the upper portion of which revolves a sleeve-like head 34 carrying rotative reel support members 32, the latter being two in number and rotatively mounted on spindles 126 projecting in alignment transversely from opposite sides of the head 34. Thus the stand 24 can simultaneously accommodate two line storage reels 30, one of which is aligned for operation with the baiter 26 while the other is offset in a position convenient for installing full and removing empty reels. This enables the operator of the vessel to set line through the baiter with the vessel underway using one rotative support member 32 of the dispensing stand 24 while he is removing from the other member a previously emptied reel and replacing it with a full reel. As soon as the end of the line is reached on the working spool, the stand is revolved 180° into its alternate position and the filled reel, ready to unspool line, is thereby placed in alignment with the baiter, a weight usually then being attached at the extreme end of its line and dropped overboard, so as to commence baiting and setting of that line. Consequently, the fishermen can, in an uninterrupted run of the vessel over the chosen fishing grounds, set a succession of lines in immediate proximity to each other so as to facilitate the later locating and recovering of those lines as well as concentrating the fishing gear over the desired fishing grounds.

It will be appreciated that the rotative support members 32 for the reels on dispensing stand 24 need not be power driven inasmuch as the drag of the water acting on the line and weight secured to the end of the line pulls the line and attached gangions from the payout reel 30 on the dispensing stand 24 through the automatic baiter 26 and the guide chute 28. Usually the vessel is proceeding slowly during this process, on autopilot or under manual control. A stud or hook 48 mounted on the stern rail 38 adjacent exit chute 28 provides a convenient retainer to which a line being set may be temporarily fastened in order to facilitate attachment of weights, buoys, or of additional lines which are to be deployed serially with one or more lines previously set. The operator standing at the station 20 during deployment and baiting of a line may observe the operation of the baiter and the contents of the baiter hopper, attach buoys and weights as needed, and be in the position to quickly remove and replace reels from the dispensing stand 24 as necessary. From this station he is also able to control the rate at which line 36 pays out from the reel 30 by use of a hydraulic brake actuating control mechanism 44 including a control bar 46, deflection of which applies a controlled amount of brake pressure to the dispensing stand rotative members and thereby to the working or payout reel 30.

The forward subsystem operating area 50 contains a functional subsystem which operates to retrieve previously set fishing lines and is so located (next to the wheel house) that the fisherman may conveniently observe the progress of the vessel and guide it along the run of set line being retrieved. As the line comes in over the guide means such as roller 62, the operator stationed at area 50 can unhook the fish and theereupon place the hooks of the gangions on the spokes of the line storage spool 30 which is mounted upon the inhaul pedestal 52 operating to spool in the line. The power-driven hauler 52 has a hydraulic motor-driven member 54 similar to the members 32 on the previously described dispensing stand 24. A hydraulic pump 64 usually mounted below decks operates from a hydraulic reservoir 66 through lines 68 to drive a reversible hydraulic torque motor 70 in the hauler pedestal 52. This motor 70 is controlled by a valve operated by a foot bar 72 or the like by which to vary the speed and direction of rotation. Additional controls on the hauler pedestal 52 provide vernier adjustments of haul speed and torque, the torque being critical in that it is desired to haul with maximum torque consistent with avoiding development of excessive tension in the line in case it snags or fouls.

With a takeup spool 30 mounted on the haul stand reel support 32, the fishermen can control the rate of inhaul and if necessary can back off line so as to properly fix the hooks on the reel spokes or interrupt the hauling momentarily to remove fish from the hooks. A rheostat 74 or other con device can be mounted on the aft side of the helm house accessible to the operator in order to enable him to change the direction of heading by inputs to the associated autopilot system (not shown). Alternatively a full set of controls may be installed at this location if desired.

Figures 2, 4:
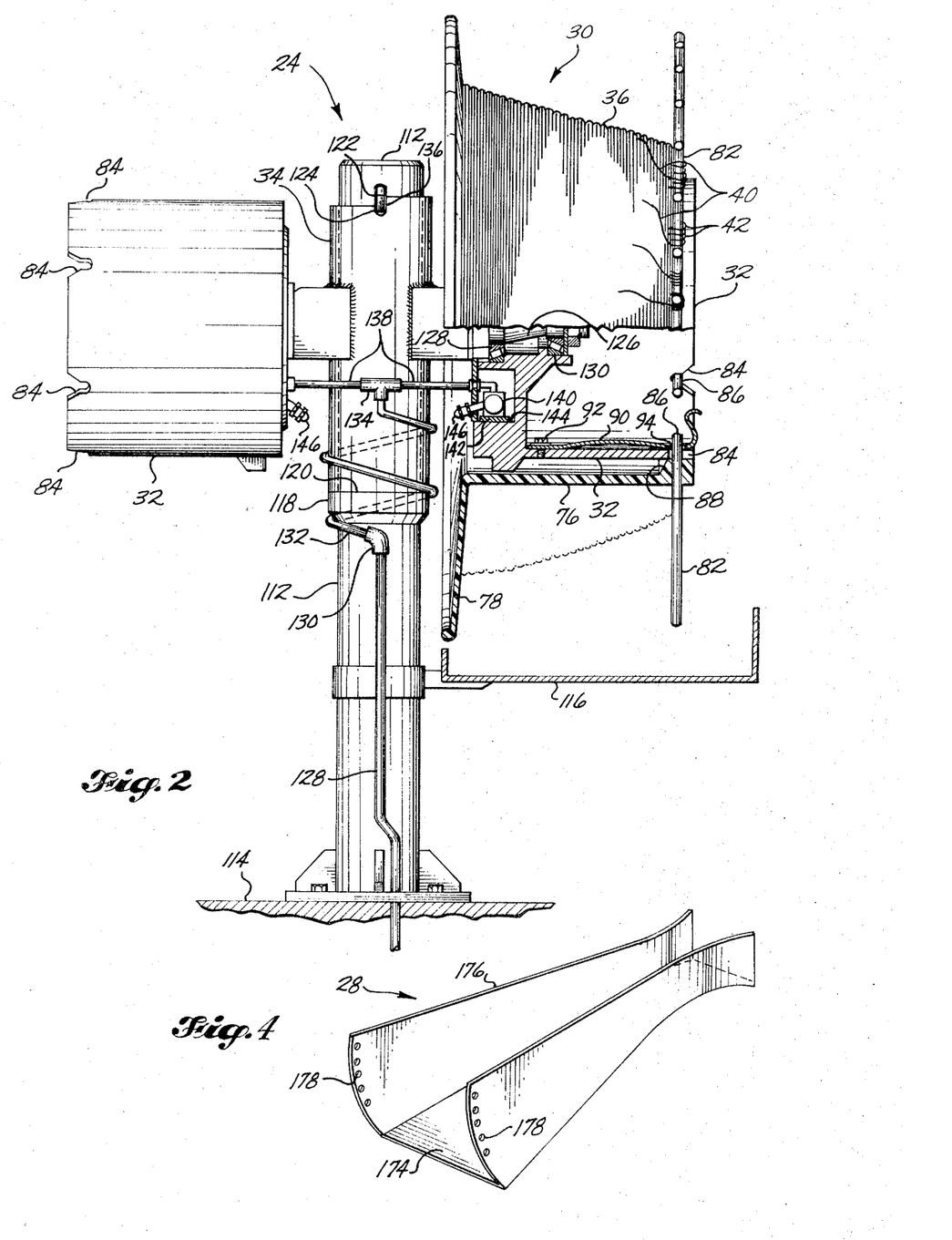
FIG. 2 is a rear elevation view, partly in section, of the reel support stand by which line is dispensed through the baiter for setting.
FIG. 4 is an isometric view of the exit chute associated with the baiter to lead the baited line over the stern.
Figure 9:
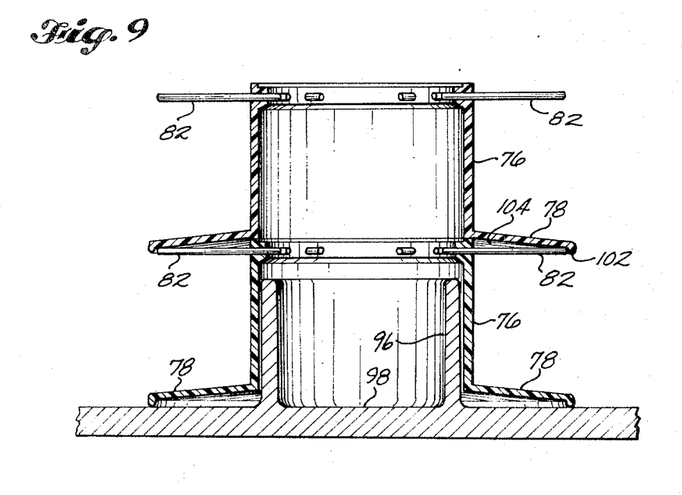
FIG. 9 is a vertical longitudinal sectional view of line storage reels retained in stacked relationship on a shallow locating stud or boss on the deck.

As shown in FIGS. 2 and 9 the individual line storage spools 30 comprise a central tubular annular spool base 76 and an integral flange 78 at one end. The base provides the physical means for storing the line and mounting the reel on the setting stand assembly and hauler pedestal reel support members 32, and for locating the bottom reel of a stack on a shallow retainer stud 98 of annular form (FIG. 9). Line 36, as wound on the control spool base 76, is channeled between the end flange 78 and a plurality of non-corrosive spokes 82 extending outwardly from the central hub 76 in a generally radial manner adjacent to the opposite end of the spool to serve as an opposite end flange. The spokes 82 in addition to performing a channelling function with regard to the winding of the line, provide the means by which a multiplicity of separate hooks and leaders can be wound on the reel in an orderly manner coincidentally with the line as disclosed in the aforesaid U.S. Pat. No. 3,626,630.

Figure 5:
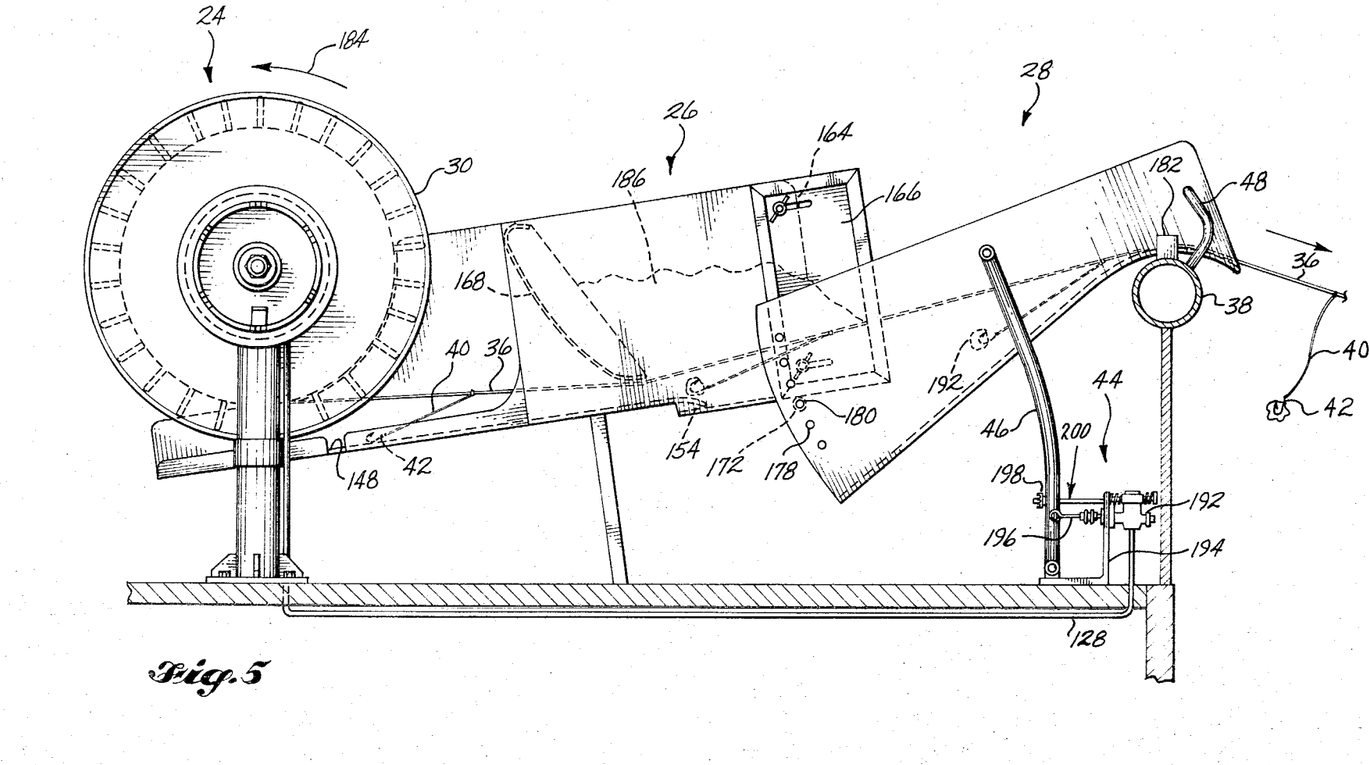
FIG. 5 is a side elevation view of the combined line dispensing baiter and exit chute, certain associated controls, and stern portion of the vessel.
Figure 6:
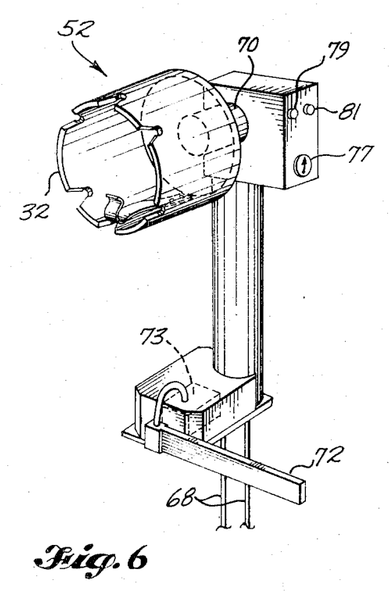
FIG. 6 is an isometric view of the line hauler stand which is mounted for example on the aft side of the helm house.

The rotative reel mounting members 32 on the setting stand 24 (FIG. 2) and on the line hauler pedestal 52 (FIG. 5) are essentially identical permitting the reels to be interchangeably mounted on the fixtures of either assembly. The members 32 shown in FIG. 2 have six evenly spaced locking notches 84 spaced around the outer rim to receive the inwardly projecting ends 86 of spokes 82 protruding through a thickening band 88 around the inside end of the reel. As the reel 30 is installed on the mounting fixture 32, the ends 86 of the spokes 82 enter the guide notches 84 and prevent radial slippage as the member 32 rotates or is braked. A releasable leaf spring latch 90 attached to the inside surface of the drum mounting fixture 32 by screw 92 acts as a latch which engages one of the spoke ends 86 to prevent accidental dislodgement of the reel from its rotative support 32. Mounting and locking of a line storage reel on the hauler pedestal drum mounting fixture 54 is accomplished in an identical manner to that just described and is illustrated in FIG. 6.

The central bases, flanges, and spokes of the line storage reels are configured to facilitate storage in a nested stacked relationship on the deck. Secure nested storage is an important feature since loose reels shifting on the deck in moderate to heavy seas could prohibit safe operation. Moreover the reels should be quickly and easily removed from and replaced on the stack during handling without necessity of manipulating locking or latching devices or of raising the heavy reels to an undue height to clear a retainer post or other holder.

Referring to FIG. 9, it will be noted that central hub 76 of a bottom reel is lowered over an annular stud or boss 96 attached to the deck 98, thus holding the bottom reel in place. The next reel placed on top of the first reel becomes locked in place laterally with it by means of a turned lip 102 around the outer extremity of flange 78 forming a downwardly open recess or pocket which accommodates within it the spokes 82 of the underlying reel. Downwardly divergent form of the flange 78 then provides a space 104 accommodating the central portion of the underlying reel in the nested relationship. This space also assures that hooks engaged with spokes on the lower reel do not interfere with storage positioning of the reels. In like manner a number of reels may be stacked successively to a desired height so as to stow a large amount of line on deck in a minimum deck area. Although not shown in the figure, simple mechanical latches can be adapted to the reels if desired in order to positively latch each reel to the next reel, especially during voyages to and from the fishing grounds. It should be noted that loaded reels would normally be stowed at 22 generally adjacent to the setting stand assembly, and empty reels at 58 adjacent to the hauler pedestal (FIG. 1).

Storage of the line with hooks and leaders attached, as described in said U.S. Pat. No. 3,626,630, elminates fouling when paying line out during setting operations. As the line pays out and separates from the coil on the payout reel, the successive hooks slide free from the spokes on which they have been stored. Since the hooks are freed serially with the line taut, there is no opportunity for hooks and leaders to foul.

Continuing with a more detailed description of the line setting subassembly, a side elevation of the setting stand assembly 24 is shown in FIG. 2. The post 112 forming the base of the stand assembly is bolted to the deck 114 adjacent to the baiter 26 such that the payout reel 30 is positioned directly above and in alignment with the input tray or guide 116. The previously described drum mounting fixtures 32 upon which the reels 30 are installed are rotatably mounted on a head assembly 34 comprising a collar revolvably mounted on the post 112. The collar 34 resets slidably on the upper annular bearing ring 118 on post 112 thus providing a pivot bearing for the head at interface 120. A pivoted bar latch 122 extending through the top of the strut 112 rests of its own weight in a notch 124 in the head collar 34. The latch permits the head to be locked in one of two rotated positions 180° apart thus allowing either of the two drum mounting fixtures 32, including mounted line storage reels 30, to be presented to the baiter 26. Aligned spindles 126 affixed to the opposite sides of the head collar 34 provide rotational support for the drum members 32, with roller bearings 128 and 130 providing the bearing interfaces.

The pressure line for the hydraulic brake system associated with the setting stand is routed from the actuating control mechanism 44 located near the stern beneath the deck 114. The rigid hydraulic line 128 emerges from beneath the deck adjacent to post 112 and, being attached to the strut for support, terminates in an elbow 130. A loosely coiled length of flexible hydraulic line 132 extends from elbow 130 to the tee fitting 134, such that as head 34 is revolved back and forth through its 180° of travel on the post 112, line 132 merely slacks or coils more tightly about the setting stand post, allowing operation of the brake in any position of the head. Note that the top of the head collar 34 is stepped such that latch bar 122, bearing against the elevated side 136 of the top of the collar, restricts head rotation to precisely 180°, thereby assuring that no undue stress is applied to flexible hose 132 by overtravel of the head. Hydraulic lines 138 extending from tee 134, which is attached to head assembly 34, are rigid lines directly attached to brake mechanisms 140 inside the drum mounting fixtures 32 on opposite sides of post 112. Actuation of the brakes results in shoe 142 bearing against an inside surface 144 of mounting fixture 32 which functions as the brake drum. Suitable mechanical latches 146, which interface with the mounting fixtures 32, allow the fixtures to be locked to prevent rotation during changing of line storage reels.

Figure 3:
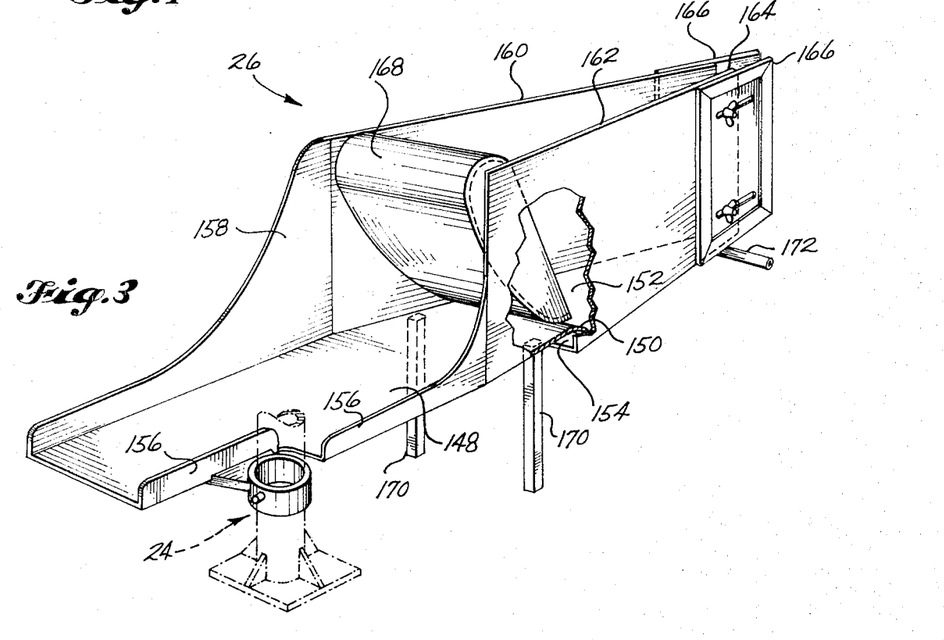
FIG. 3 is an isometric view of the baiter through which the line passes in being set.

The improved line guiding baiter 26 is well adapted for utilization with the line setting apparatus 24 as described above, and is illustrated in some detail in FIGS. 3 and 5. The baiter 26 includes rearwardly inclined guide or ramp section with bottom wall 148 which terminates beneath the bait compartment where it has a downturned lip 150, and adjoining upright sides 156, 158. Continuing aft, the baiter bottom wall 152 is offset below the entrance guide bottom 148 so as to form an opening 154 between the two bottom wall sections. The vertical sides of the guide ramp, in the forward portion, are formed on one side by low transversely offset panels 156 on the side adjacent to the setting stand 24. The panels on both sides are shaped and cut away appropriately to provide convenient access to, and facilitate operation of the setting stand and line storage reels mounted thereon. The sides of the baiter in the after portion are formed by mutually converging panels 160 and 162 which terminate in a narrow vertical slot 164 defining the baiter exit. Adjustable plates 166 on each side panel adjacent to slot 164 allow the width of the exit to be adjustable. A contoured half-shell or downwardly sloped partition panel 168 is permanently affixed to side panel 160 in the after portion of the baiter and projects transversely therefrom toward the opposite side 162 in cantilever fashion overlying inclined ramp 148. This panel 168 terminates short of side 162 to form a slot through which line may be placed in the baiter without threading it through. The partition 168 defines the forward wall of a bait hopper included between sides 160 and 162 and above bottom wall 152. The baiter assembly is supported on deck by legs 170. A pipe fixture 172 on the underside of the after inclined ramp bottom 152, just forward of the baiter exit opening 164, provides the means for supporting the forward end of an exit chute 28. The exit chute 28 (FIG. 4), cooperates with the baiter in guiding the baited line overboard and in the recovery of bait pieces which are drawn out of the hopper but not securely impaled by hooks 42. As can be seen in FIG. 4, the exit chute is a simple guide chute with contoured ramp 174 and side panels 176. Holes 178 in the side panels accommodate a support bar 180 (FIG. 5) which, when inserted through a pair of the holes while including pipe fitting 172 on the aft end of the baiter 26 as shown in FIG. 5, attaches the exit chute to the baiter. By raising the aft end of the exit chute from its normal position of rest on the aft rail 38 any pieces of bait caught in the chute slide off its ramp onto the deck or into a container (not shown). Retainer flanges 182 on the rail function to restrict lateral movement out of the chute.

As pointed out in previous text the setting stand is situated such that the payout reel 30 is directly confronted by the entrance of the baiter, which is substantially as wide as or wider than the payout reel. As the reel rotates in the unspooling direction indicated by arrow 184 to pay out line 36 and attached leaders and hooks 40 to the baiter 26, the line wanders back and forth across the width of the baiter so as to pass the hooks through different parts of the mass of bait in the hopper and thereby more or less uniformly use up the bait therein. Otherwise a channel would be formed through the bait at one location and some of the hooks would go unbaited.

With the vessel underway, the drag of the weight and line through the water will cause line to be drawn from the payout reel 30. With continual rotational payout of line 36, successive hooks 42 will slide outwardly on their respective reel spokes to separate from the reel 30 and thence fall upon the forward inclined ramp 148 of the baiter 26. As the line passes through the baiter, the individual leaders and hooks will be drawn through the forward opening of the bait compartment 186 formed between the upper surface of the forward inclined ramp 148 and the lower surface of half-shell panel 168 which effectively depresses the line toward the bottom of the baiter. After passing through the opening, the leaders and hooks are drawn through the mass of pieces of bait. The general forward incline of the aft side of the half-shell panel 168 and the aft incline of ramp sections 154, tend to compact the bait 190 in the area of the opening beneath and adjacent to the half-shell panel 168, creating the ideal region for the hooks to snag bait as they pass through the bait compartment. Morsels of bait engaged by each hook are impaled upon the hooks and carried along with the line toward the baiter exit 164. Passing through the constriction formed by the adjustable panels 166 tends to further assure, with proper adjustment of panels 166 for the kind of bait used, that the bait morsels are positively impaled on the hooks. From the baiter output slot 164, the baited hooks 42 are guided over the stern rail 38 by the coutoured exit chute 28. As previously stated, stud 48 provides a convenient line retainer when attaching weight, buoys or other lines for serial deployment.

FIG. 5 also illustrates the actuating mechanism 44 for the hydraulic brake associated with the setting stand assembly 24. The mechanism is comprised of a housing 192 attached to a deck mounted bracket 194 which incorporates a fluid reservoir and actuating cylinder assembly. An actuating lever bar 46 pivoted on the deck mounted bracket 194 is pivotally attached to drive link 196 which operates the actuationg cylinder in the housing assembly. Nut 198 on rod 200 provides an adjustment for brake tension. The brake is designed to provide the operator with hands-free operation. The operator can lean against the actuating bar using the weight and leverage of his body so as to actuate the brake to meet the requirements of the payout line.

Figure 7:
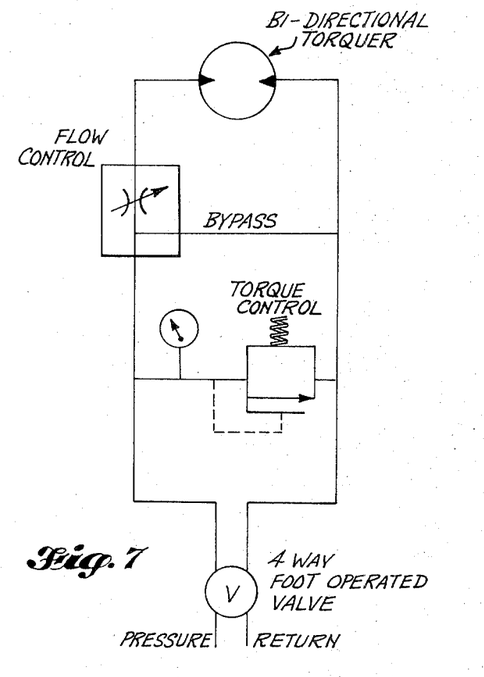
FIG. 7 is a schematic diagram of the line hauler hydraulic drive system.

The hauler pedestal 52, as illustrated in FIG. 6, is the primary element of the line retrieval subsystem since it provides both the power and control for retrieving the line. The pedestal is characterized by a drum mounting fixture 54 for supporting and rotatively driving line storage reels 30. The fixture 54 has been previously described herein as being physically and functionally identical to the fixtures 32 employed on the setting stand assembly, except that rather than being freewheeling with a brake to govern rotational payout of the line, the fixture 54 on the hauler pedestal is powered by a bi-directional hydraulic torque motor 70 so as to haul in and pay out the line under power. The torque motor is powered through pressure and return lines 68 connected to a pump and reservoir beneath the deck. The torque motor speed and directional control is supplied by a four-way valve 73 operated by footbar 72. The pedestal also provides a hydraulic fluid pressure gauge 77 and vernier speed and torque adjustments 79 and 81. FIG. 7 provides a schematic of the associated hydraulic system.

Figure 8:
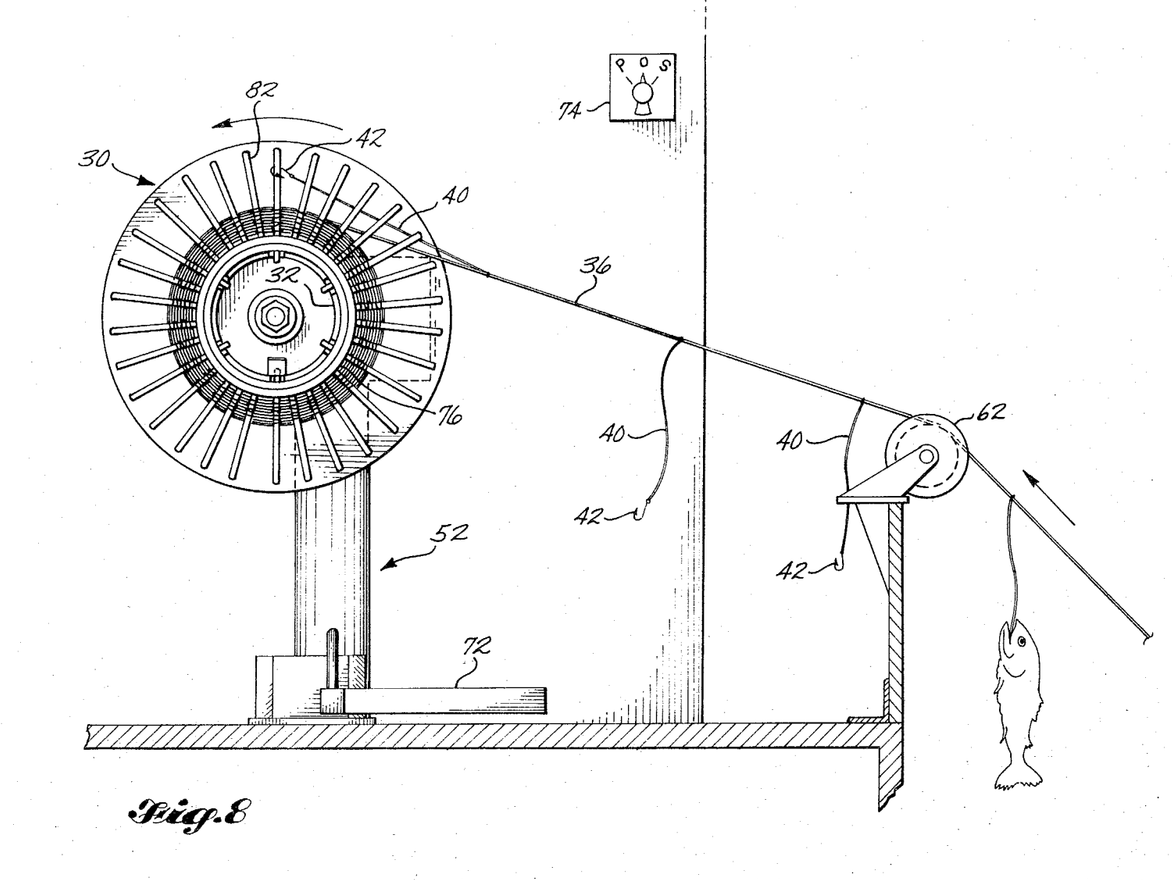
FIG. 8 is a rear elevation view of the line hauler including guide roller mounted on the vessel's rail.

In practice the line hauler pedestal 52 (FIG. 8) receives an empty line storage reel 30 which is mounted on the drum fixture 32 in a manner identical to that described in the operation of the setting stand assembly. The leader end of the line 36 to be retrieved is passed over roller guide 62 and attached to the takeup reel 30 by looping the line about the central hub 76 thereof or by securing it to a spoke 82. When the footbar 72 is actuated in the appropriate direction by the operator, the takeup reel rotate rotates at a controlled speed and with limited available torque in a counterclockwise direction as viewed in the figure, thus winding the line about the reel. While attending the line hauler footbar control 72, the operator removes the catch from the line and successively extends each leader 40 toward the rotating reel 30 and engages the attached hook 42 with a spoke 82 on the reel. Continued rotation causes the hook to ride down the spoke until it seats against the central hub 76, the line enwrapping the hub, or other hooks already on the spoke. At the same time, the leader 40 is simultaneously wound on the reel with the line 36. As retrieval of the line progresses the heading of the vessel in relation to the deployed portion of the line is adjustable via the remote con 74 mounted on the after wall of the cabin structure. This conning capability is a valuable feature which can be used to prevent snagging and fouling of the line in the water during retrieval. The ability to reverse the direction of the hauler reel using the foot-operated bar control can complement the advantages derived through the remote conning feature as related to line retrieval.

Although the present invention has been illustrated with respect to a single preferred embodiment thereof, it is not intended to limit the scope of invention to the details of description or illustration herein.

I claim:

1. In a fishing line handling system, line dispensing apparatus mountable on a fishing vessel to permit dispensing fishing line from different individual line storage reels interchangeable on said dispensing apparatus, said apparatus comprising reel support means including individual reel support devices thereon adapted for supporting first and second individual line storage reels independently in spaced relationship on said support means, said support devices including elements rotatively journaling the respective reels thereon to permit line-unreeling rotation of such reels about respective generally horizontal axes, line guide means mountable on a fishing vessel in cooperable positional relationship with the first reel on said reel support means so as to lead fishing line overboard being unreeled from said first reel, said reel support means further including means movably mounting said reel support devices for shifting of said first reel out of said cooperative positional relationship with said line guide means while simultaneously shifting said second reel into such positional relationship, and visa-versa, thereby permitting interchange of an empty reel with a full one on either reel support device while line is being unreeled from a reel on the other reel support device.

2. The apparatus defined in claim 1, wherein the reel support means comprises an upright stand, a mounting head, means revolvably supporting the mounting head on said stand so as to permit turning of the mounting head on said stand about an upright axis, and wherein the individual reel support devices are carried by the mounting head at respectively opposite sides of said mounting head, said reel support devices comprising rotatable support members for the respective reels, and selectively actuatable brake means operably associated with the respective rotatable members to apply braking force selectively to the reels.

3. The apparatus defined in claim 2, wherein the rotatable support members are of annular generally cylindrical form and wherein the respective reels comprise annular tubular members slidably insertable over said rotatable support members and with line-retaining flange means at their respective ends, the flange means at one end of each reel tubular member comprising a series of generally radial spokes adapted to receive gangion hooks on the stored line, and cooperable latch elements on each reel and rotatable support member for realeasably retaining the reel on the rotatable support member.

4. The apparatus defined in claim 3, wherein the reels comprise molded glass fiber reinforced plastic tubular members having an integral flange at one end and the generally radial spokes at the opposite end, at least certain of the spokes having inner ends projecting into the interior of the tubular members, the rotatable support members having an outer rim with notches therein adapted to receive the inner ends of said spokes with the reel mounted and latched on the rotatable support member.

5. The apparatus defined in claim 4, wherein the integrally formed flanges on the reels have turned outer lip elements forming a retainer end pocket into which the spoked end of another reel may be nested and retained so as to permit stacking of reels on the deck of the vessel, the vessel having a shallow retainer means thereon to positionally hold the bottom reel of the stack against sliding across the deck.

6. The apparatus defined in claim 2, wherein the line guide means and dispensing apparatus are mounted adjacent the stern near one side of the vessel, means are provided abovedecks adjacent the opposite side of the vessel to stow a plurality of line reels and intermediate working space is provided for an operator stationed adjacent the stern in position to observe the line guide means and handle the line emerging therefrom, and brake actuator control means for the dispensing apparatus mounted accessibly to the operator so stationed in said working space to control braking force applied to the reel unspooling line through the baiter.

7. The apparatus defined in claim 1, wherein the line guide means comprises an automatic baiter device including an entrance chute having a forward end adjacent the reel unspooling line to it which is substantially at least as wide horizontally as the length of the reel, said entrance chute having a bottom adjoined by upright sides which converge to a reduced width forming an exit at its aft end, a partition extending transversely between said sides sloping downwardly and aft to converge with the bottom so as to form a relatively high entrance generally confronting the unspooling line storage reel, and a relatively narrow exit adjacent the bottom of the entrance chute, means comprising the sides and bottom of said entrance chute aft of said partition forming a hopper to receive a mass of bait pieces through which the line passes in reaching said exit.

8. The apparatus defined in claim 7, wherein the partition extends transversely substantially from one side wall to a location adjacent to but spaced from the other side wall so as to form a line threading slot for insertion of line into the baiter device transversely of the line's length.

9. The apparatus defined in claim 7, wherein the side walls have mutually convergent endwise extension pieces which are longitudinally adjustable thereon so as to vary the width of the exit.

10. The apparatus defined in claim 7, and an exit chute extending rearwardly from and generally aligned with the exit, and including a bottom wall and adjoining upright side walls, the bottom wall sloping upwardly in the rearward direction from a location spaced beneath the exit to form an opening out of which unhooked bait may drop to be recovered.

11. The apparatus defined in claim 1, wherein the dispensing apparatus is mounted adjacent the stern of the vessel and further comprising at a relative forward location on the vessel line hauling means including a power driven reel support member on which empty line storage reels may be removably mounted to spool in fishing line over the side of the vessel, reversible, adjustable torque motor means connected to drive said power driven reel support member and controls by which to start and stop the motor, drive it selectively in either direction and separately to vary the maximum torque applied to the reel during spooling in of line on the reel.

12. An automatic long-line dispenser and baiter assembly comprising means to support a line storage reel abovedecks of a vessel for rotation on a transverse axis so as to spool line overboard therefrom, and an automatic baiter device mounted to confront the reel and through which the unspooling line passes, said baiter including an entrance chute having a forward end adjacent the reel unspooling line to it which is substantially at least as wide horizontally as the length of the reel, said entrance chute having a bottom adjoined by upright sides which converge to a reduced width forming an exit at its aft end, a partition extending transversely between said sides sloping downwardly and aft to converge with the bottom so as to form a relatively high entrance generally confronting the unspooling line storage reel, and a relatively narrow exit adjacent the bottom of the entrance chute, means comprising the sides and bottom of said entrance chute aft of said partition forming a hopper to receive a mass of bait pieces through which the line passes in reaching said exit.

13. The system defined in claim 12, wherein the partition extends transversely substantially from one side wall to a location adjacent to but spaced from the other side wall so as to form a line threading slot for insertion of line into the baiter device transversely of the line's length.

14. The system defined in claim 12, wherein the side walls have mutually convergent endwise extension pieces which are longitudinally adjustable thereon so as to vary the width of the exit.

15. The system defined in claim 12, and an exit chute extending rearwardly from and generally aligned with the exit, and including a bottom wall and ajoining upright side walls, the bottom wall sloping upwardly in the rearward direction from a location spaced beneath the exit to form an opening out of which unhooked bait may drop to be recovered.

16. A nestable line storage reel for long lining on fishing vessels, comprising an annular tubular central portion on which line is wound having an outturned flange at one end and a series of generally radially extending hook retainer spokes at the opposite end, the flange having turned lip means at the rim portion forming a retention pocket adapted to accommodate therein the spoked end of another reel in nested relationship so as to permit stacking of reels in nested relationship.

17. The reel defined in claim 16, wherein at least certain of the spokes project into the interior of the central tubular member to form abutment elements adapted to engage with a reel mounting member.

18. In combination storage means for long lines on a fishing vessel, comprising a plurality of line storage reels each comprising an annular tubular central portion on which line is wound having an outturned flange at one end and a series of generally radially extending hook retainer spokes at the opposite end, the flange having turned lip means at the rim portion forming a retention pocket adapted to accommodate therein the spoked end of another reel in nested relationship so as to permit stacking of reels in nested relationship, and shallow retainer means on the deck of the vessel engageable solely with the bottom reel of a stack of such reels to hold the same against sliding across the deck.

19. Apparatus for fishing with long lines having gangions carrying hooks thereon comprising a long line storage reel demountable on a rotative support, said reel comprising an annular tubular hub member having a central axis, an outwardly extending flange on one end of said tubular hub member transverse to said axis, a series of generally radially outwardly projecting hook retainer spokes at the opposite end of said tubular hub member substantially in a plane transverse to said axis to define, in conjunction with the flange, a line storage space therebetween surrounding the tubular hub member, said tubular hub member having an unrestricted central opening through one end interiorly thereof to permit freely inserting and removing a rotative support in a relative axial direction, said tubular hub member having seating means interiorly thereof adjacent the opposite end thereof with both axially directed and circumferentially directed surfaces adapted to seat against complemental surfaces of a rotative support approaching full insertion of the rotative support into the hub member, thereby respectively to limit such insertion movement and to prevent rotational movement of the reel relative to the inserted rotational support.

20. The apparatus defined in claim 19, wherein the spokes are uniformly spaced circumferentially of the tubular hub member and at least certain of the spokes project through the tubular hub member into the interior thereof, and reel support means comprising an annular support member having endwise opening slots in the inserted end thereof into which slots the reel spokes may seat in any of different relatively rotated positions of the reel and support member.

21. The apparatus defined in claim 20, wherein the tubular annular support member and reel have cooperating latch elements thereon interengageable substantially upon completion of insertion of the annular support member in the tubular hub member, one such latch element being engageable with the other latch element in any of such different relatively rotated positions of the reel and support member.

* * * * *